United States Patent
Tanabe et al.

(10) Patent No.: US 7,916,867 B2
(45) Date of Patent: Mar. 29, 2011

(54) CONTENT RECEIVING APPARATUS

(75) Inventors: Takumi Tanabe, Hyogo (JP); Yuuki Okamoto, Osaka (JP); Yasushi Ayaki, Osaka (JP)

(73) Assignee: Panasonic Corporation, Osaka (JP)

( * ) Notice: Subject to any disclaimer, the term of this patent is extended or adjusted under 35 U.S.C. 154(b) by 1001 days.

(21) Appl. No.: 11/640,389

(22) Filed: Dec. 18, 2006

(65) Prior Publication Data

US 2007/0140490 A1    Jun. 21, 2007

(30) Foreign Application Priority Data

Dec. 21, 2005 (JP) ................. 2005-368728

(51) Int. Cl.
*H04L 9/00* (2006.01)
(52) U.S. Cl. .............. 380/241; 380/240; 380/242
(58) Field of Classification Search .............. 380/241
See application file for complete search history.

(56) References Cited

U.S. PATENT DOCUMENTS

| | | | | |
|---|---|---|---|---|
| 4,888,800 | A * | 12/1989 | Marshall et al. | 380/281 |
| 6,263,437 | B1 * | 7/2001 | Liao et al. | 713/169 |
| 6,477,649 | B2 * | 11/2002 | Kambayashi et al. | 726/27 |
| 7,334,125 | B1 * | 2/2008 | Pellacuru | 713/163 |
| 7,404,084 | B2 * | 7/2008 | Fransdonk | 713/176 |
| 2002/0002466 | A1 * | 1/2002 | Kambayashi et al. | 705/1 |
| 2002/0194010 | A1 * | 12/2002 | Bergler et al. | 705/1 |
| 2005/0097340 | A1 * | 5/2005 | Pedlow et al. | 713/189 |

FOREIGN PATENT DOCUMENTS

| | | |
|---|---|---|
| JP | 2001-84177 A | 3/2001 |
| JP | 2002-366440 A | 12/2002 |
| JP | 2004-5816 A | 1/2004 |

OTHER PUBLICATIONS

Fielding, et al., "Hypertext Transfer Protocol-HTTP/1.1", Jun. 1999, RFC2616.
"Digital Transmission Content Protection Specification vol. 1 (Informational Version)", Feb. 28, 2005, pp. 1-81, Revision 1.4, Hitachi, Ltd., Intel Corporation, Matsushita Electric Industrial Co., Ltd., Sony Corporation, Toshiba Corporation.

* cited by examiner

*Primary Examiner* — Nasser Moazzami
*Assistant Examiner* — Ghazal Shehni
(74) *Attorney, Agent, or Firm* — McDermott Will & Emery LLP (57) ABSTRACT

A content receiving apparatus, capable of resuming transmission of a content without assigning a new key even when transmission of the content is suspended, is provided. A content receiving apparatus is an apparatus which receives contents. The content receiving apparatus includes: a key exchange unit which exchanges, with a content transmitting apparatus for transmitting a content, a key which is to be used in encrypting a content and which is valid only for a prescribed period; a reception unit which receives the content encrypted by using the key; a detection unit which detects when a time during which the key is not used reaches a prescribed time; and a transmission unit which transmits, to the content transmitting apparatus, information for not making the key invalid, when it is detected that the time during which the key is not is used has reached the prescribed time.

9 Claims, 9 Drawing Sheets

GET file003.mpg HTTP/1.1
X-Range: bytes=128555008-129134591
```

… # CONTENT RECEIVING APPARATUS

BACKGROUND OF THE INVENTION (1) Field of the Invention

The present invention relates to a content receiving apparatus which receives contents, and in particular, to a technology for controlling a validity period of a key used in encrypting a content requiring copyright protection.

(2) Description of the Related Art

Recently, with the enhancement of communication infrastructures and the development of network technologies, images and music expressed in digital data (hereinafter referred to as "contents") are exchanged actively on networks. For example, there is a case where a content recorded by a DVD recorder is viewed from a TV via a network or is dubbed in another DVD recorder via a network.

Dubbing does not need a real-time capability, so it can be suspended if other processing of higher priority cuts in. For instance, when a TV program for which recording has been scheduled on a DVD recorder is about to start, dubbing is suspended so as to start recording the TV program, and the dubbing is resumed after the recording ends. This enables the system as a whole to efficiently perform processing.

As a method for suspending and resuming transmission of a content via a network, a method in which Hyper Text Transfer Protocol (HTTP) is used for transmitting a content, and the range of the content is specified in the range header is being considered (e.g. refer to "Hypertext Transfer Protocol-HTTP/1.1", by R. Fielding et al., RFC2616). That is, when a transmission of a content is resumed, the content receiving apparatus specifies, in the range header, a range where transmission has not been completed, and transmits a GET request using HTTP to a content transmitting apparatus. In this manner, there is no need to transmit the content again from the beginning, and thus efficient suspension and resumption can be realized.

Note that for premium contents requiring copyright protection such as contents transmitted in recent digital terrestrial broadcasting, there are cases where dubbing is not allowed, and only moving is allowed. When a premium content is moved, the premium content on the content transmitting apparatus side is deleted or made unusable (e.g. refer to Digital Transmission Content Protection Specification Volume 1 (Informational Version), Hitachi, Ltd, Intel Corporation, Matsushita Electric Industrial Co., Ltd., Sony Corporation, Toshiba Corporation, Revision 1.4, Feb. 28, 2005). However, a premium content must not be deleted from the content transmitting apparatus when it has not been stored correctly on the content receiving apparatus. For example, Japanese Laid-Open Patent Application No. 2002-366440 discloses a method for conveying, to a content transmitting apparatus, that a premium content has been received correctly by the content receiving apparatus. Further, Japanese Laid-Open Patent Application Nos. 2004-5816 and 2001-84177 disclose methods for restoring an original premium content on a content transmitting apparatus side when the premium content is not stored correctly in the content receiving apparatus due to some reason.

SUMMARY OF THE INVENTION

In general, when a premium content is moved, encrypted communications using a key are performed. In a case of encrypted communications using a key, a validity period of the key is set for ensuring security. Among some methods of setting a validity period, there is one in which a key is discarded when a prescribed period elapses without the key being used for encryption or decryption of a premium content.

For example, in Digital Transmission Content Protection (DTCP) which is one of standards for copyright protection technology, when an "Exchange Key" which is a key for generating a key is not used for more than two hours, the "Exchange Key" must be discarded (e.g. refer to Digital Transmission Content Protection Specification Volume 1 (Informational Version)). In other words, when transmission of a content is suspended for some reason, there are cases where the "Exchange Key" may be discarded as the "Exchange Key" is not used during the suspension period.

When the suspension period ends and transmission of the content is resumed, a new key must be assigned in the case where the previous key has been discarded. However, when the new key is assigned, there is a case where it is impossible to distinguish whether content transmission after resumption is performed with the same context as that of the content transmission before suspension.

For example, in DTCP, a content transmitting apparatus uses an "Exchange Key" for distinguishing the context. Therefore, even when a new "Exchange Key" is assigned and the content transmission is resumed, the content transmitting apparatus considers that the content transmission after resumption is performed with a context that is different from that of the content transmission before suspension. When this occurs, if the content transmitting apparatus deletes the content since all of the content are assumed to have been transmitted, the means for validating the content on the content receiving apparatus side cannot be used.

The present invention has been developed in view of such a problem. It is an object of the present invention to provide a content receiving apparatus capable of resuming content transmission without assigning a new key, even when the content transmission is suspended.

In order to achieve the object, the content receiving apparatus according to the present invention is a content receiving apparatus which receives a content, including: a key exchange unit which exchanges a key with a content transmitting apparatus which transmits a content, the key being valid only for a prescribed period, and used in encrypting a content or a key encrypting the content; a reception unit which receives the content encrypted using the key or a key encrypted by the key; a detection unit which detects when a time during which the key is not used reaches a prescribed time; and a transmission unit which transmits, to the content transmitting apparatus, information for not making the key invalid, when it is detected that the time during which the key is not used has reached the prescribed time. With this, the key is not made invalid even when content transmission is suspended, and thus allowing content transmission to be resumed without assigning a new key.

Here, it is also possible to have the transmission unit transmit, to the content transmitting apparatus, an acquisition request for acquiring a part of the content encrypted using the key or a key encrypted by the key. With this, the key is used for transmitting a part of the content and, since the validity period of the key is updated at the content transmitting apparatus side, it is possible to prevent the key from becoming invalid.

Further, it is also possible to have the transmission unit transmit, to the content transmitting apparatus, an acquisition request for acquiring the content encrypted using the key or a key encrypted by the key, only in a size corresponding to a multiple of the unit of the encryption using the key or a key encrypted by the key. With this, the content can be acquired in small sizes, so it is possible to reduce the load placed on the content receiving apparatus.

Further, it is also possible to have the transmission unit transmit, to the content transmitting apparatus, an acquisition request for acquiring the content encrypted by using the key or a key encrypted by the key, only in a multiple of 16 bytes corresponding to the unit of the encryption using the key or a key encrypted by the key. With this, in the case where the content transmission conforms to DTCP, the content can be acquired by 16-byte units, which is the minimum unit for this encryption, so it is possible to minimize the load placed on the content receiving apparatus.

Further, it is also possible to have, in the case where the reception unit receives a content transmitted from the content transmitting apparatus in response to the acquisition request, the reception unit discard the content. With this, it is possible to immediately discard the content acquired only for maintaining the key.

Further, it is also possible to have the transmission unit transmit an update command for updating a validity period of the key to the content transmitting apparatus. With this, there is no need to repeatedly transmit a part of the content, providing an effect of not placing a load, not only on the content receiving apparatus and the content transmitting apparatus, but also on the network.

Further, it is also possible to have the detection unit set a time which is shorter than a validity period of the key, as the prescribed time. With this, even if the content transmission is suspended, a part of the content is transmitted repeatedly before the validity period of the key expires.

Further, it is also possible to have the detection unit start counting the time during which the key is not used, at a point where a connection with the content transmitting apparatus is disconnected during reception of the content, or at a point of receiving, from the content transmitting apparatus, a response to the information for not making the key invalid. This is because counting the time during which the key is not used, is considered to be started on the content transmitting apparatus side at such a point.

Further, it is also possible to have the key exchange unit exchange an "Exchange Key" with the content transmitting apparatus for transmitting the content, the "Exchange Key" being a key generation key defined in Digital Transmission Content Protection (DTCP). With this, even when transmission of a content encrypted by using the "Exchange Key" is suspended, the "Exchange Key" will not become invalid.

Note that the present invention can be realized not only as such a content receiving apparatus, but also as a content receiving method having the characteristic units included in the content receiving apparatus as steps, and a program which causes a computer to execute such steps. It is needless to say that such a program can be distributed via a recording medium such as a CD-ROM, and a transmission medium such as the Internet.

As described above, according to the content receiving apparatus of the present invention, a key will not become invalid even when transmission of a content is suspended. Therefore, it is possible to resume transmission of the content without assigning a new key. More specifically, even when transmission of the content is suspended, a part of the content is repeatedly transmitted before the validity period of the key expires, so the key will not become invalid, and the context of the content transmission will not be interrupted. With this, even when the content is deleted at the content transmitting apparatus side due to the transmission of the whole content, it is possible to validate the content at the content receiving apparatus side. This is particularly useful in maintaining the validity of the "Exchange Key" in DTCP.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENTS

Embodiments of the present invention are described hereinafter with reference to the diagrams.

First Embodiment

Figure 1:
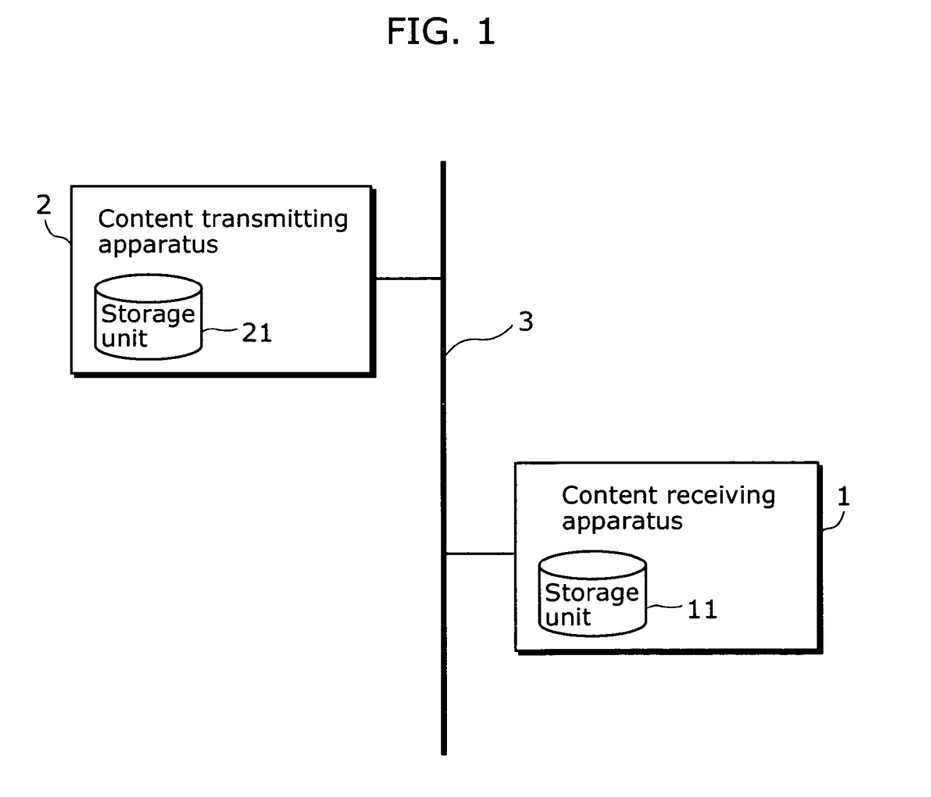
FIG. 1 is a diagram showing a use environment of the content receiving apparatus according to a first embodiment.

FIG. 1 is a diagram showing a use environment of a content receiving apparatus 1 according to the first embodiment. Here, a state in which the content receiving apparatus 1 and a content transmitting apparatus 2 are connected via a network 3 is shown. The content receiving apparatus 1 may be a DVD recorder which receives premium contents requiring copyright protection (hereinafter simply referred to as "contents") from the content transmitting apparatus 2 and stores them on a storage unit 11. The content transmitting apparatus 2 may be a set top box which transmits contents stored on a storage unit 21 to the content receiving apparatus 1. The network 3 may be a wired or wireless local area network (LAN), or a link cable compliant with IEEE1394 standard. Transmission of contents will be in conformity with protocols stipulated or recommended in the DTCP standard.

Figure 2:
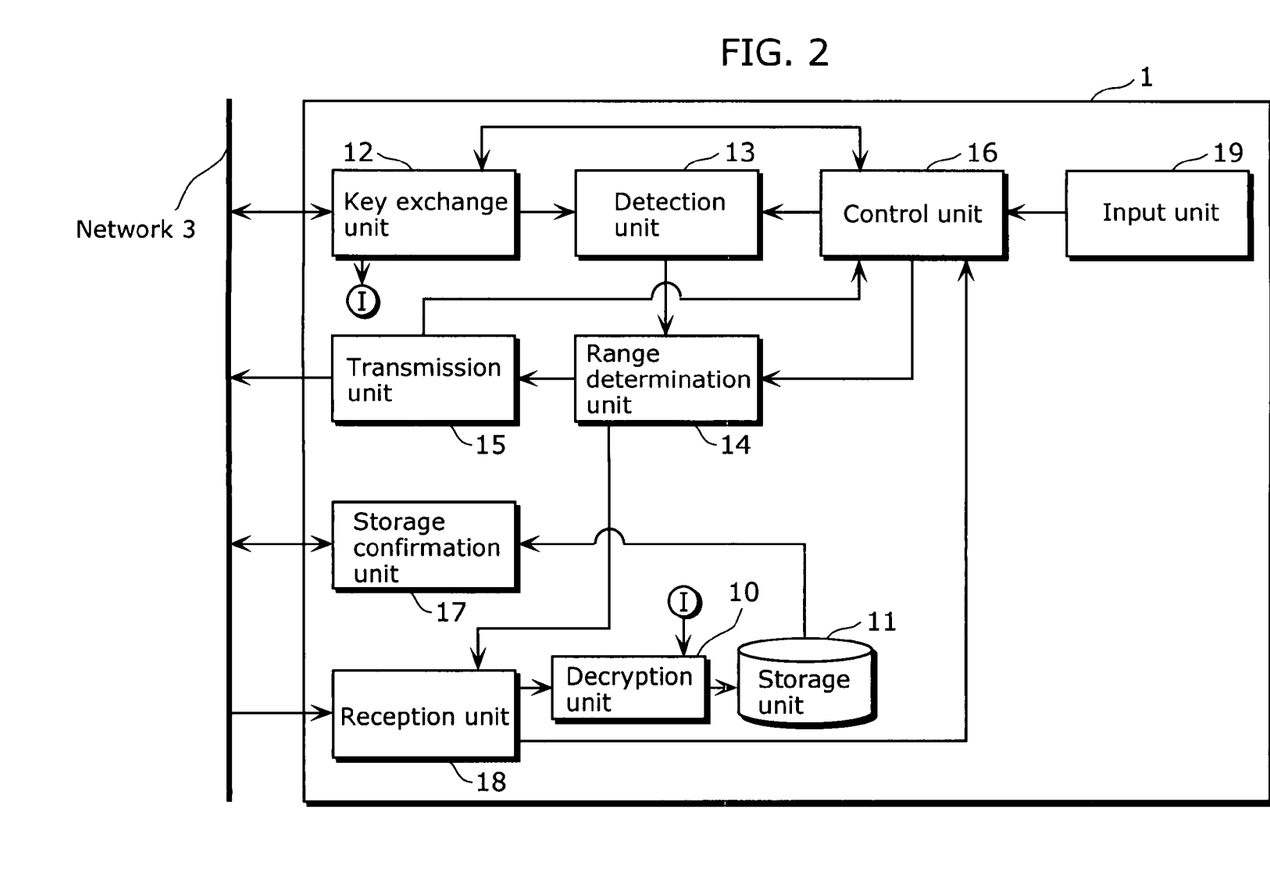
FIG. 2 is a block diagram showing the internal configuration of the content receiving apparatus according to the first embodiment.

FIG. 2 is a block diagram showing the internal configuration of the content receiving apparatus 1 according to the first embodiment. As shown in FIG. 2, the content receiving apparatus 1 functionally includes a storage unit 11, a key exchange unit 12, a detection unit 13, a range determination unit 14, a transmission unit 15, a control unit 16, a storage confirmation unit 17, a reception unit 18, an input unit 19, and a decryption unit 10.

The storage unit 11 may be a hard disk which stores a content received by the reception unit 18. The key exchange unit 12 exchanges keys, to be used in encrypting a content or a key encrypting the content and valid only for a prescribed period, with the content transmitting apparatus 2. The detection unit 13 may be a key timer which detects when a period during which the key is not used has reached a prescribed time. The range determination unit 14 determines a range of a content to be acquired from the content transmitting apparatus 2, based on an instruction from the control unit 16. The transmission unit 15 transmits a content acquisition request specifying the range determined by the range determination unit 14 to the content transmitting apparatus 2. The control unit 16 controls the whole of the content receiving apparatus 1. The storage confirmation unit 17 performs communications with the content transmitting apparatus 2 upon confirming that the content is stored correctly in the storage unit 11, so that the content is deleted correctly from the content transmission unit 2. The reception unit 18 receives a content or the like from the content transmitting apparatus 2. The input unit 19 may be various buttons for inputting instructions from a user and notifying these to the control unit 16. The decryption unit 10 decrypts an encrypted content by using the key exchanged by the key exchange unit 12.

Figure 3:
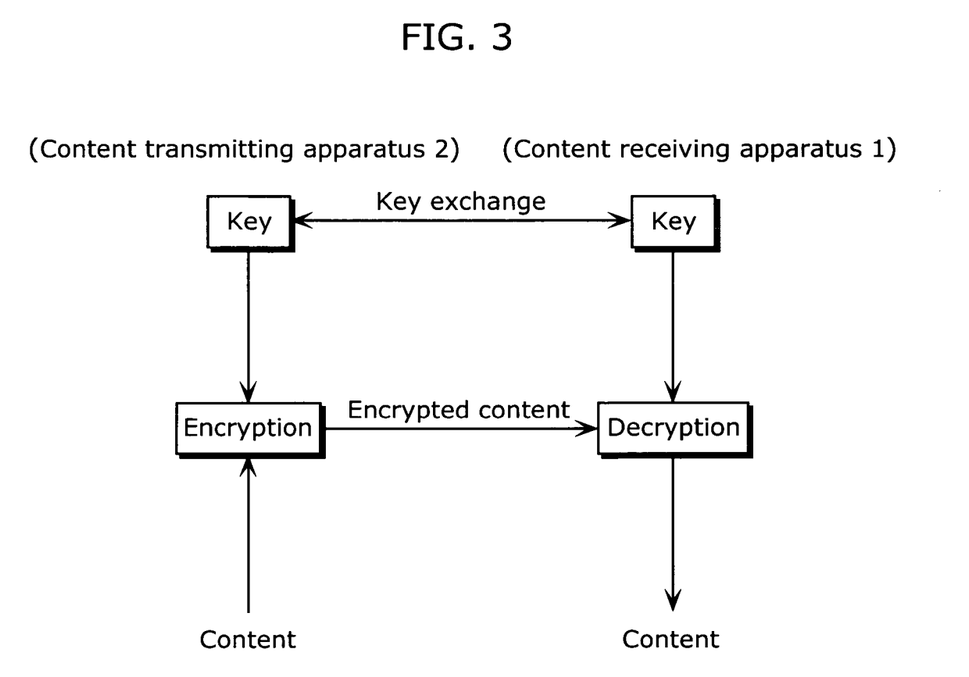
FIG. 3 is a diagram showing of the appearance of exchanging (sharing) a key.

FIG. 3 is a diagram showing the appearance of the exchanging of a key between the content receiving apparatus 1 and the content transmitting apparatus 2. In DTCP, the content receiving apparatus 1 and the content transmitting apparatus 2 perform authentication with each other in accordance with a prescribed procedure, and then, perform the following operation to share a "content key". That is, first, the content transmitting apparatus 2 transmits an "Exchange Key", which is a key generation key, to the content receiving apparatus 1. At this time, the "Exchange Key" is encrypted using another key. Next, as a seed of the "content key", the initial value of a numerical value called Nc of 64 bits is determined. In determining the Nc initial value, random numbers are used. The content transmitting apparatus 2 generates the "content key" based on the parameter containing the "Exchange Key" and Nc, and encrypts a content by using the key and transmits it. When the content is transmitted, Nc is also transmitted at the same time. In the same manner as the content transmitting apparatus 2, the content receiving apparatus 1 generates the "content key" by using the parameter containing the "Exchange Key" and Nc, to thereby decrypt the content. The Nc is changed from time to time by means of a prescribed method during transmission of the content, so the "content key" is also changed accordingly.

As described above, when the "Exchange Key" is not used for more than 2 hours, the "Exchange Key" must be discarded. The "Exchange Key" is managed on the content transmitting apparatus 2 side. When transmission of the content is interrupted for some reason, the "Exchange Key" will not be used during the suspension period, so the "Exchange Key" will be discarded by the content transmitting apparatus 2.

Figure 4:
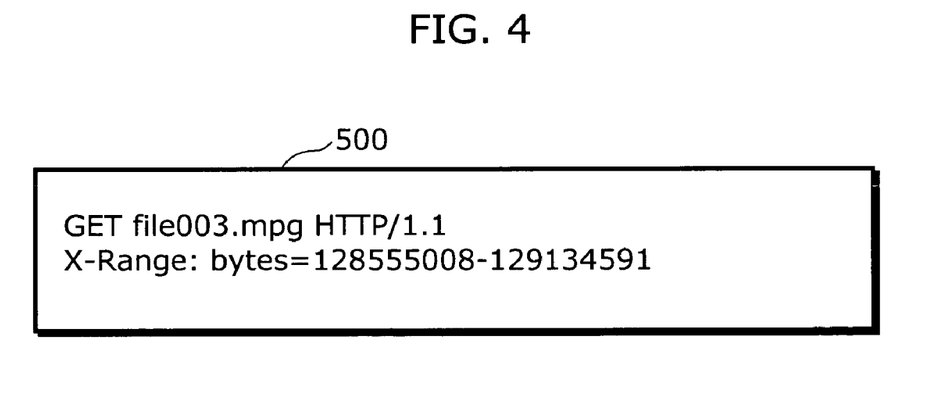
FIG. 4 is a diagram showing an example of a content acquisition request.

FIG. 4 is a diagram showing an example of a content acquisition request transmitted from the content receiving apparatus 1 to the content transmitting apparatus 2. Here, an HTTP request message 500 is exemplified in which HTTP is used for content transmission, and the content range is specified in the X-Range header. "file003.mpg" shown in FIG. 4 indicates the file name of a content to be acquired, and the numerical values on the right side of "X-Range: bytes=" indicate the range of the content to be acquired. In other words, the HTTP request message 500 is a request for acquiring a content with the file name of file003.mpg, from the 128,555,009th byte to the 129,134,592nd byte.

Figure 5:
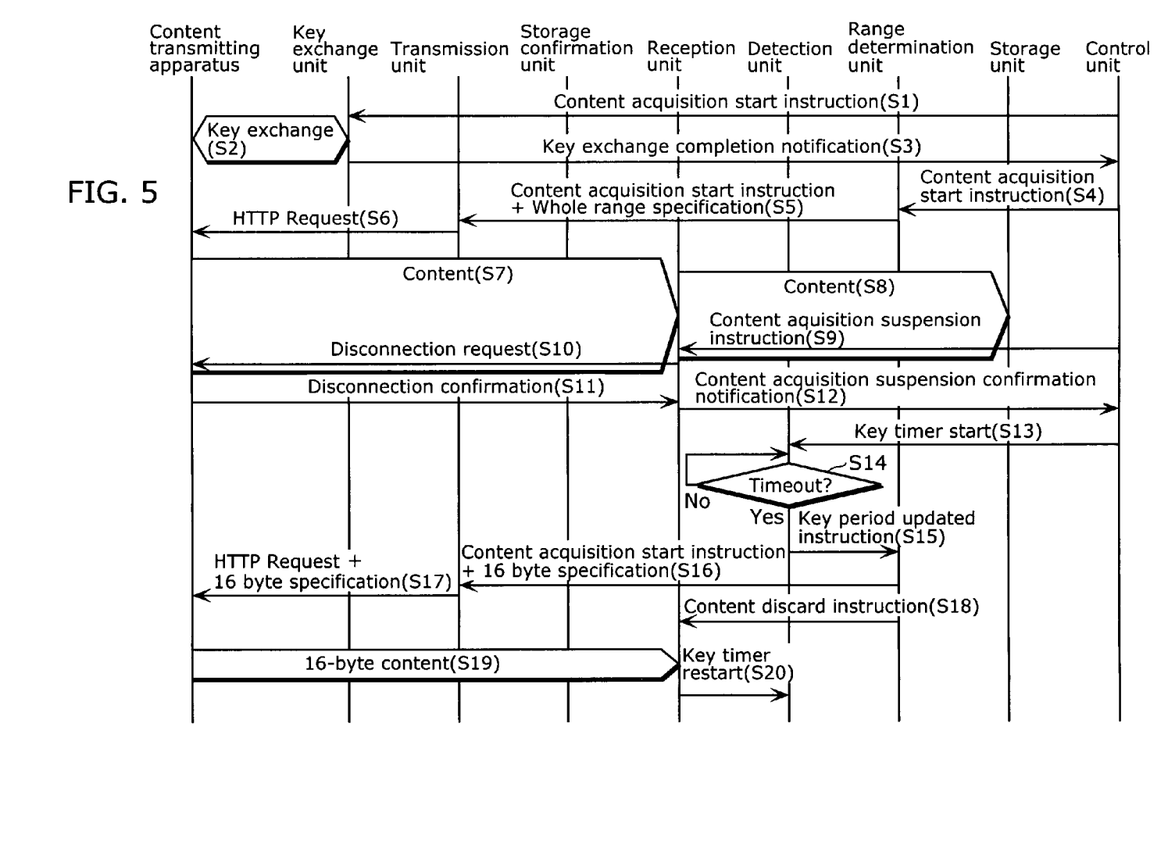
FIG. 5 is a sequence diagram showing an operation of the content receiving apparatus according to the first embodiment.
Figure 6:
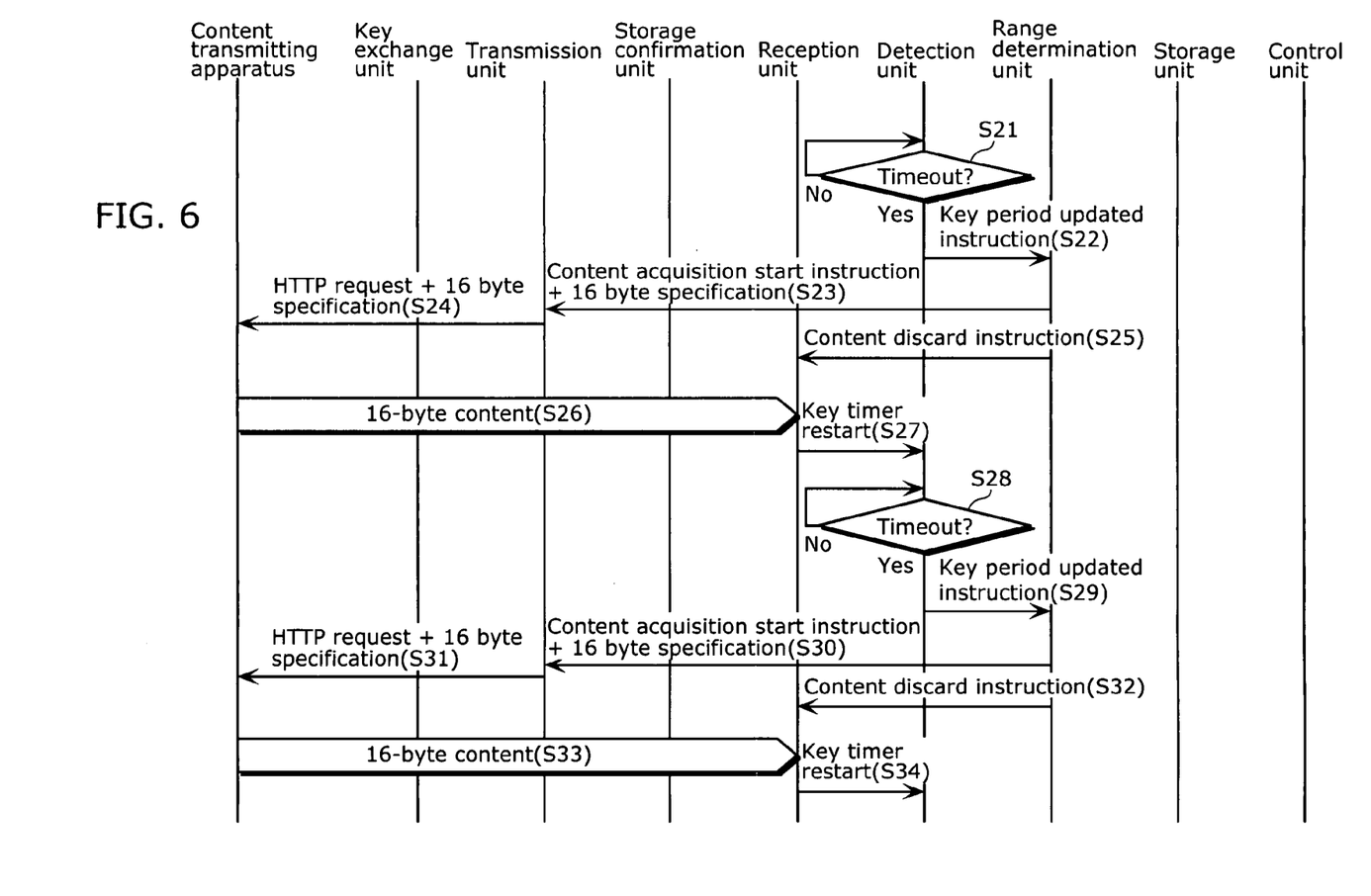
FIG. 6 is a sequence diagram showing an operation of the content receiving apparatus according to the first embodiment.
Figure 7:
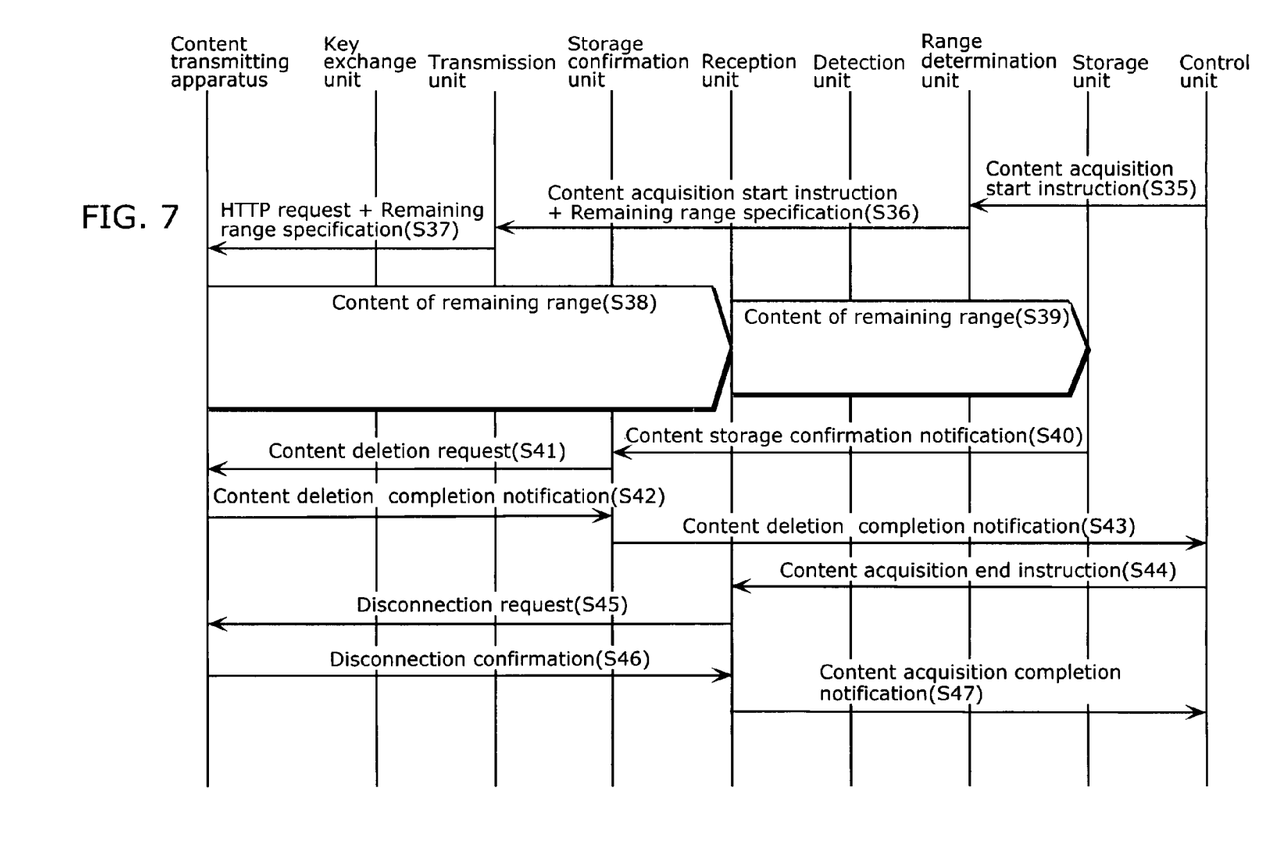
FIG. 7 is a sequence diagram showing an operation of the content receiving apparatus according to the first embodiment.

FIGS. 5, 6 and 7 are sequence diagrams showing the operation of the content receiving apparatus 1 according to the first embodiment 1. The operation of the content receiving apparatus 1 is explained hereinafter by using these diagrams.

First, when a user instructs the input unit 19 to start acquisition of a content, the instruction is given to the key exchange unit 12 via the control unit 16 (S1). If the key exchange unit 12 has not performed key exchange with the content transmitting apparatus 2, it performs key exchange in accordance with a prescribed procedure (S2). When the key exchange is completed, the key exchange unit 12 notifies the control unit 16 of such fact (S3).

Upon receiving the key exchange completion notification, the control unit 16 instructs the range determination unit 14 to start the acquisition of the content (S4). The instruction includes a content identifier such as URI (Uniform Resource Identifier). The range determination unit 14 instructs the transmission unit 15 to start acquisition of the content while specifying the whole range of the content (S5). The transmission unit 15 generates an HTTP request message for acquiring the whole range of the content, and transmits this to the content transmitting apparatus 2 (S6).

Upon receiving the encrypted content from the content transmitting apparatus 2, the reception unit 18 removes the protocol header and gives this to the decryption unit 10 (S7). The decryption unit 10 decrypts the content by using the key exchanged by the key exchange unit 12 or a key derived from the key exchanged by the key exchange unit 12, and gives the decrypted content to the storage unit 11. The storage unit 11 normally applies an encryption different from that at the time of transmission, and stores the content (S8).

Here, when the user presses a pause button during the reception of the content, the instruction is notified to the control unit 16 via the input unit 19. The control unit 16 instructs the reception unit 18 to suspend transmission of the content (S9). The reception unit 18 disconnects the connection with the content transmitting apparatus 2 so as to suspend the transmission of the content (S10), and upon confirmation of the disconnection (S11), notifies such fact to the control unit 16 (S12).

The control unit 16 instructs the detection unit 13 to start a key timer (S13). The detection unit 13 starts the key timer and, upon detecting the lapse of the prescribed time, times out (Yes in S14), and instructs the range determination unit 14 to update the validity period of the key (S15). The "prescribed time" monitored by the key timer of the detection unit 13 may be any time as long as it is shorter than the validity period of the key, but it is preferable that the time be close to the validity period of the key as much as possible. However, the timer monitoring the validity period of the key is provided on the content transmitting apparatus 2 side, and it is not synchronized with the key timer of the detection unit 13. Therefore, if the validity period of the key is two hours, it is reasonable to set the "prescribed time" monitored by the key timer of the detection unit 13 to about one and a half hours.

The range determination unit 14 instructs the transmission unit 15 to acquire arbitrary 16 bytes, that is, 16 bytes from the head for example, for the same content as that before suspending the transmission (S16). At the same time, the range determination unit 14 instructs the reception unit 18 to discard a content it receives from now (S18). The reason why the size of a content to be acquired is set to 16 bytes is that a unit of encryption used in DTCP is 16 bytes. Sizes corresponding to multiples of 16 bytes such as 32 bytes are acceptable, instead of 16 bytes. When another encryption method is used, it is only necessary to acquire a content of a size corresponding to multiples of an encryption unit thereof.

The transmission unit 15 generates an HTTP request message for acquiring arbitrary 16 bytes of the content, and transmits it to the content transmitting apparatus 2 (S17). The content transmitting apparatus 2 transmits the specified 16-byte content to the content receiving apparatus 1 (S19). The reception unit 18 receives the 16-byte content, but discards the content and instructs the detection unit 13 to restart the key timer (S20). Instruction to restart the key timer may be given by the control unit 16. That is, the same effect can be achieved even when the reception unit 18 discards the content and notifies such fact to the control unit 16 and, upon receiving the notification, the control unit 16 instructs the detection unit 13 to restart the key timer.

When the 16-byte content is transmitted from the content transmitting apparatus 2 to the content receiving apparatus 1 in this way, the key used before the suspension of the transmission is to be used. Therefore, processing to update the validity period of the key, such as resetting the timer monitoring the validity period of the key, is performed on the content transmitting apparatus 2 side.

Subsequently, the operation same as in steps S14 to S20 are repeated until the reason for suspending the content transmission is solved (S21 to S34). During that period, the 16-byte content is transmitted regularly from the content transmitting apparatus 2 to the content receiving apparatus 1, so the validity period of the key is updated regularly also on the content transmitting apparatus 2 side.

Then, when the reason for suspending the transmission is solved, such as when the user presses a button to release the pause, the control unit 16 instructs the range determination unit 14 to resume transmission of the content (S35). The range determination unit 14 instructs the transmission unit 15 to acquire the range for which transmission has not been completed (hereinafter referred to as "remaining range") of the same content as that transmitted before suspending the transmission (S36). The transmission unit 15 generates an HTTP request message for acquiring the remaining range of the content, and transmits it to the content transmitting apparatus 2 (S37).

When the reception unit 18 receives the encrypted remaining range of the content from the content transmitting apparatus 2, it removes the protocol header and gives it to the decryption unit 10 (S38). The decryption unit 10 decrypts the content by using the same key or a key derived by using the same key as that used before suspending the transmission, and gives the decrypted content to the storage unit 11. The storage unit 11 stores the remaining range of the content, and then notifies the storage confirmation unit 17 of the fact that the whole range of the content is stored (S40).

Upon confirming that the content is stored correctly in the storage unit 11, the storage confirmation unit 17 requests the content transmitting apparatus 2 to delete the content (S41). The content transmitting apparatus 2 deletes the content from the storage unit 21, and then notifies the storage confirmation unit 17 of such fact (S42). When the storage confirmation unit 17 gives the notification to the control unit 16 (S43), the control unit 16 instructs the reception unit 18 to end acquisition of the content (S44). The reception unit 18 disconnects the connection with the content transmitting apparatus 2 (S45) and, upon confirming the disconnection of the connection (S46), notifies the control unit 16 of the fact (S47).

As described above, according to the content receiving apparatus 1 of the first embodiment, even when transmission of a content is suspended, a part of the content is repeatedly transmitted before the validity period of the key expires, so the key will not be discarded and the context of the content transmission will not be interrupted. With this, even the content is deleted on the content transmitting apparatus side by virtue of the whole content being transmitted, it is possible to validate the content on the content receiving apparatus side. This is particularly effective in maintaining the validity of the "Exchange Key" in DTCP.

Note that although the case of suspending transmission of a content due to a user pressing a pause button is exemplified, the reason for suspension is not limited to this. For example, the same effect can be achieved even when the control unit 16 suspends reception of the content due to the increase in the load on the content receiving apparatus 1 caused by other processes of higher priority. Even in this case, a part of the content is transmitted repeatedly only for maintaining the key, and the size of the content is a small 16 bytes, as described above. Further, the 16-byte content is discarded immediately after being received by the content receiving apparatus 1, so influence on other processes being carried out is considered insignificant.

Further, although a configuration in which a content discard instruction is given to the reception unit 18 each time the key timer times out (S18, S25, S32) has been described, the present invention is not limited to this configuration. That is, it is also acceptable that a content discard instruction can be given only once in the step S18, and when the reason for suspending the transmission is solved, an instruction to release the content discard instruction is given from the control unit 16 to the reception unit 18.

Second Embodiment

In the first embodiment, a mode in which a part of a content is repeatedly transmitted has been explained. In the second embodiment, a mode in which an update command for updating a validity period of a key is repeatedly transmitted to the content transmitting apparatus 2 is explained.

Hereinafter, a configuration of the content receiving apparatus 1 according to the second embodiment is explained focusing on the points that are different from the first embodiment. The constituent elements of the content receiving apparatus 1 according to the second embodiment are the same as those of the first embodiment, so explanation is also carried out by using the block diagram of FIG. 2.

Figure 8:
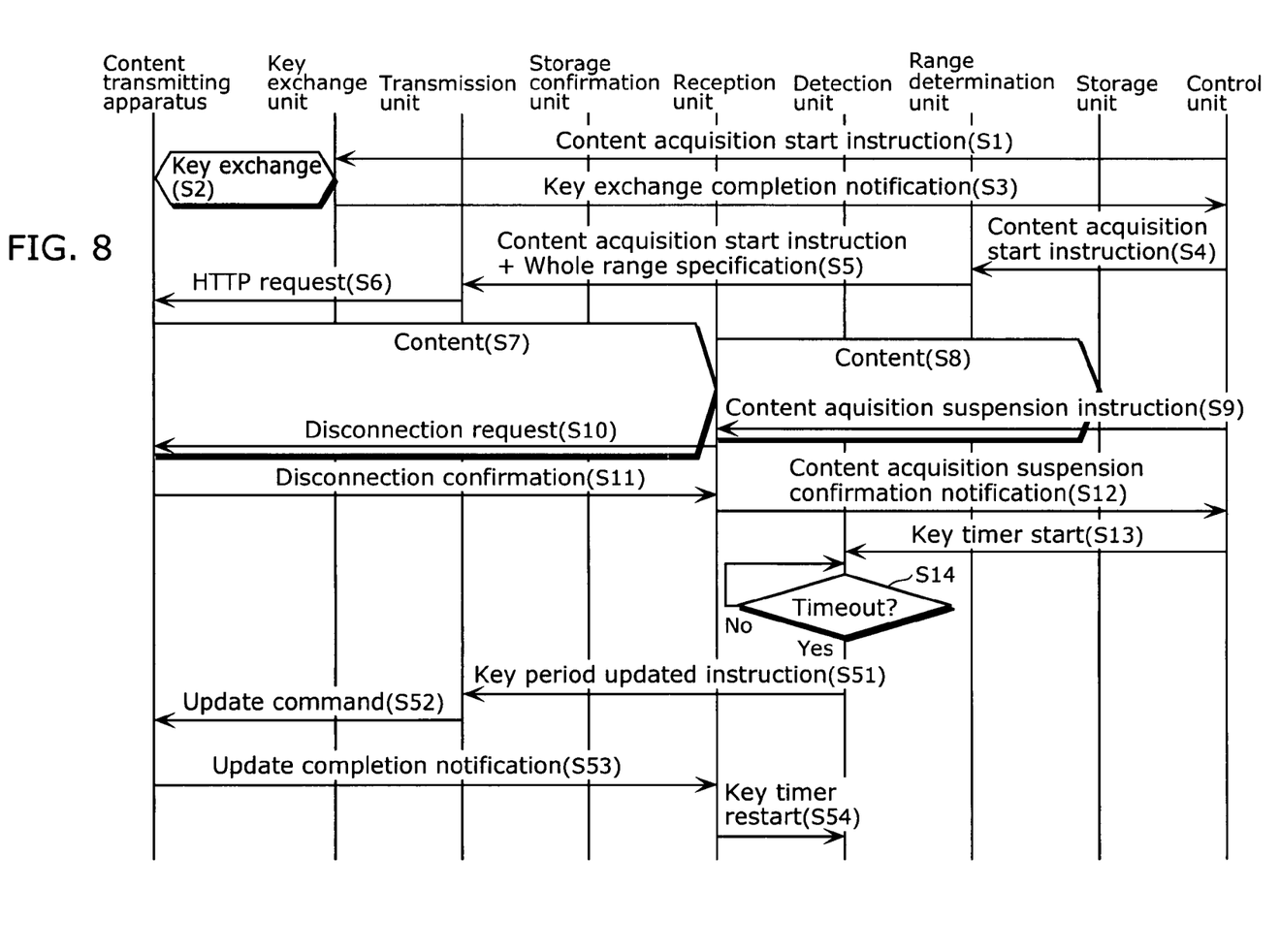
FIG. 8 is a sequence diagram showing an operation of the content receiving apparatus according to a second embodiment.
Figure 9:
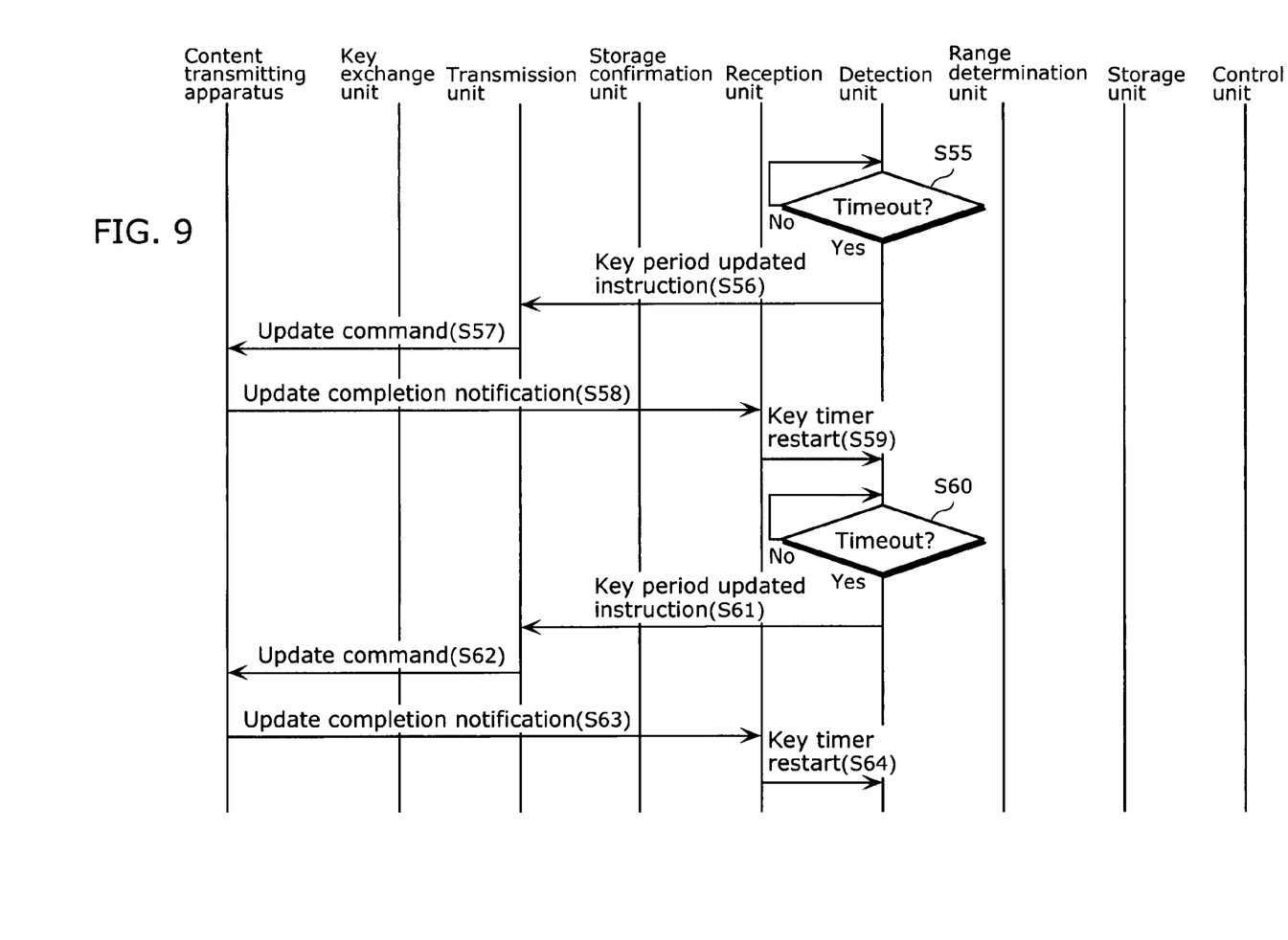
FIG. 9 is a sequence diagram showing an operation of the content receiving apparatus according to the second embodiment.

FIGS. 8 and 9 are sequence diagrams showing the operation of the content receiving apparatus 1 according to the second embodiment. The operation up to when the detection unit 13 detects that the prescribed time has elapsed (FIG. 8, S1 to S14) is same as that of the first embodiment (FIG. 5, S1 to S14).

In other words, when a user instructs the input unit 19 to start acquisition of a content, the instruction is given to the key exchange unit 12 via the controller 16 (S1). When the key exchange unit 12 has not performed key exchange with the content transmitting apparatus 2, it performs key exchange in accordance with a prescribed procedure (S2), and when the key exchange has been completed, it notifies the controller 16 of the fact (S3).

Upon receiving the key exchange completion notification, the controller 16 instructs the range determination unit 14 to start acquisition of the content (S4). The range determination unit 14 specifies the whole range of the content, and instructs the transmission unit 15 to start acquisition of the content (S5). The transmission unit 15 generates an HTTP request message for acquiring the whole range of the content, and transmits this to the content transmitting apparatus 2 (S6).

Upon receiving the encrypted content from the content transmitting apparatus 2, the reception unit 18 removes the protocol header and gives it to the decryption unit 10 (S7).

The decryption unit 10 decrypts the content by using the key exchanged by the key exchange unit 12 or a key derived from the key exchanged by the key exchange unit 12, and gives the decrypted content to the storage unit 11. The storage unit 11 normally applies encryption that is different from that of the time of transmission, and then stores the content (S8).

When the user presses a pause button during reception of the content, this instruction is notified to the controller 16 via the input unit 19. The controller 16 instructs the reception unit 18 to suspend transmission of the content (S9). The reception unit 18 suspends transmission of the content by disconnecting the connection with the content transmitting apparatus 2 (S10) and, upon confirming the disconnection (S11), notifies the controller 16 of the fact (S12). The controller 16 instructs the detection unit 13 to start the key timer (S13). The detection unit 13 starts the key timer and times out upon detecting that a prescribed time has elapsed (Yes in S14).

The subsequent operation is different from that of the first embodiment.

That is, when the detection unit 13 detects that the prescribed time has elapsed (Yes in S14), it instructs the transmission unit 15 to update the validity period of the key (S51). The transmission unit 15 transmits an update command for updating the validity period of the key to the content transmitting apparatus 2 (S52). On the content transmitting apparatus 2 side, processing to update the validity period of the key such as resetting the timer monitoring the validity period of the key is performed, and then, the fact that the update has been completed is notified to the content receiving apparatus 1 (S53).

Upon receiving the update completion notification, the reception unit 18 instructs the detection unit 13 to restart the key timer (S54). The instruction to restart the key timer may be given by the controller 16. In other words, the same effect can be achieved even when the reception unit 18 receives the update completion notification and notifies the controller 16 of the fact, and the controller 16, upon receiving the notification, instructs the detection unit 13 to restart the key timer.

From here on, operation which is the same as the steps S14 to S54 is repeated (S55 to S64) until the reason for suspending the content transmission is solved. During that period, since an update command is transmitted regularly from the content receiving apparatus 1 to the content transmitting apparatus 2, the validity period of the key is updated regularly on the content transmitting apparatus 2 side.

Since the subsequent operation is same as that of the first embodiment (FIG. 7, S35 to S47), illustration shall be omitted, and only explanation shall be carried out. When the reason for suspending the transmission is solved, such as when the user presses a button for releasing the pause, the control unit 16 instructs the range determination unit 14 to restart transmission of the content (S35). The range determination unit 14 instructs the transmission unit 15 to acquire the remaining range of the same content as that transmitted before suspending the transmission (S36). The transmission unit 15 generates an HTTP request message for acquiring the remaining range of the content, and transmits this to the content transmitting apparatus 2 (S37).

Upon receiving the encrypted remaining range of the content from the content transmitting apparatus 2, the reception unit 18 removes the protocol header and gives it to the decryption unit 10 (S38). The decryption unit 10 decrypts the content by using the same key or a key derived by using the same key as that used before suspending the transmission, and gives the decrypted content to the storage unit 11. The storage unit 11 stores the remaining range of the content (S39), and then notifies the storage confirmation unit 17 of the fact that the whole range of the content is stored (S40).

Upon confirming that the content is stored correctly in the storage unit 11, the storage confirmation unit 17 requests the content transmitting apparatus 2 to delete the content (S41). The content transmitting apparatus 2 deletes the content from the storage unit 21, and then notifies the storage confirmation unit 17 of the fact (S42). When the storage confirmation unit 17 forwards such notification to the control unit 16 (S43), the control unit 16 instructs the reception unit 18 to end acquisition of the content (S44). The reception unit 18 disconnects the connection with the content transmitting apparatus 2 (S45) and, upon confirming the disconnection of the connection (S46), notifies the control unit 16 of the fact (S47).

As described above, according to the content receiving apparatus 1 of the second embodiment, even when transmission of a content is suspended, an update command for updating the validity period of the key is repeatedly transmitted to the content transmitting apparatus 2 before the validity period of the key expires. Therefore, the key will not be discarded and the context of the content transmission will not be interrupted, as in the first embodiment. Further, since it is not necessary to transmit a part of the content repeatedly in the second embodiment, there is an effect that, aside from the content receiving apparatus 1 and the content transmitting apparatus 2, the network 3 is also not burdened with a load.

In the description above, the format of the update command has not been referred to specifically. This is because any update command is acceptable as long as it can be understood by the content transmitting apparatus 2. That is, it is only necessary that the validity period of the key is updated by the content transmitting apparatus 2 receiving an update command, so the format of the command is not limited.

Further, although a configuration, in which a key timer is provided on the content receiving apparatus 1 side such that the time during which the key is not used is counted on the content receiving apparatus 1 side is exemplified in the above description, the present invention is not limited to this configuration. A configuration in which the content receiving apparatus 1 inquires the content transmitting apparatus 2 about the remaining time of the validity period of the key and the like may be adopted.

Further, although it has been described that the content receiving apparatus 1 starts the counting of the time during which the key is not used, at the point where the connection with the content transmitting apparatus 2 is disconnected during reception of the content (S13) or at the point of receiving a response from the content transmitting apparatus 2 corresponding to information for preventing the key from becoming invalid (S20, S54), the present invention is not limited to this configuration. In other words it is also possible to that, when the content transmitting apparatus 2 starts counting the time during which a key is not used, a notification thereof is transmitted from the content transmitting apparatus 2 to the content receiving apparatus 1. Note that in a case of counting the time during which a key is not used, on the content receiving apparatus 1 side without changing the configuration of the content transmitting apparatus 2, it is preferable to start counting at the point of the step S13 or the step S20 as described above. This is because such points are considered to be the starting points for the counting of the time during which a key is not used, on the content transmitting apparatus 2 side.

Further, although a configuration for not discarding a key generation key, that is, the "Exchange Key", has been exemplified in the description above, the type of key is not limited to this type. The same effect can be achieved with any key as long as it becomes invalid when a certain period elapses without the key being used.

Further, although a configuration for transmitting a premium content requiring copyright protection has been exemplified, the content to be transmitted is not limited to the premium content. That is, the same effect can be achieved for any content that is encrypted by using a key.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The content receiving apparatus according to the present invention is useful as a DVD recorder, a personal video recorder, or the like which requires the resumption of content transmission without assigning a new key, even in the case where the content transmission is suspended.

What is claimed is:

1. A content receiving apparatus which receives a content, comprising:
    a key exchange unit configured to exchange a first key with a content transmitting apparatus which transmits a content, where the first key being used in encrypting either a content or a second key which encrypts the content and becomes invalid when a time period during which the first key is not used exceeds a first prescribed period;
    a hardware reception unit configured to receive the content encrypted by using the first key or the second key;
    a detection unit configured to detect whether the time period during which the first key is not used reaches a second prescribed period which is shorter than the first prescribed period, by counting the time period during which the first key is not used, in the case where reception of the content is suspended; and
    a transmission unit configured to transmit, when the detection unit detects that the time period during which the first key is not used has reached the second prescribed period, to the content transmitting apparatus, before the first key becomes invalid, information for not making the first key invalid, in the case where reception of the content is suspended, wherein:
    said detection unit is configured to start counting the time period during which the first key is not used, at a point where a connection with the content transmitting apparatus is disconnected during the reception of the content, or at a point of receiving, from the content transmitting apparatus, a response to the information for not making the first key invalid, and after the reception of the content is resumed, the reception unit is further configured to receive a remaining portion of the content encrypted using the first key or the second key.

2. The content receiving apparatus according to claim 1, wherein said transmission unit is configured to transmit, to the content transmitting apparatus, an acquisition request for acquiring a part of the content encrypted using the first key or the second key.

3. The content receiving apparatus according to claim 2, wherein in the case where said reception unit receives the part of the content transmitted from the content transmitting apparatus in response to the acquisition request, said reception unit is configured to discard the received content.

4. The content receiving apparatus according to claim 1, wherein said transmission unit is configured to transmit, to the content transmitting apparatus, an acquisition request for acquiring the content encrypted using the key or the key encrypted by the key, only in a size corresponding to a multiple of a unit of the encryption using the first key or the second key.

5. The content receiving apparatus according to claim 1, wherein said transmission unit is configured to transmit, to the content transmitting apparatus, an acquisition request for acquiring the content encrypted by using the first key or the second key, only in a multiple of 16 bytes corresponding to a unit of the encryption using the first key or the second key.

6. The content receiving apparatus according to claim 1, wherein said transmission unit is configured to transmit an update command for updating a validity period of the first key to the content transmitting apparatus.

7. The content receiving apparatus according to claim 1, wherein said key exchange unit is configured to exchange an "Exchange Key" with the content transmitting apparatus for transmitting the content, the "Exchange Key" being a key generation key defined in Digital Transmission Content Protection (DTCP).

8. A content reception method for receiving a content, comprising steps of:
    exchanging a first key with a content transmitting apparatus which transmits a content, where the first key is used in encrypting either a content or a second key which encrypts the content, and becomes invalid when a time period during which the first key is not used exceeds a first prescribed period;
    receiving a content encrypted by using the first key or the second key;
    detecting whether the time period during which the first key is not used reaches a second prescribed period which is shorter than the first prescribed period, by counting the time period during which the first key is not used, in the case where reception of the content is suspended;
    transmitting, when it is detected that the time period during which the first key is not used has reached the second prescribed period, to the content transmitting apparatus, before the first key becomes invalid, information for not making the first key invalid, in the case where reception of the content is suspended, wherein:
    said step of detecting includes starting of counting the time period during which the first key is not used, at a point where a connection with the content transmitting apparatus is disconnected during the reception of the content, or at a point of receiving, from the content transmitting apparatus, a response to the information for not making the first key invalid, and
    after the reception of the content is resumed, receiving a remaining portion of the content encrypted using the first key or the second key.

9. A non-transitory computer-readable recording medium storing a program for receiving a content, the program, when executed by a computer, causes the computer to execute steps of:
    exchanging a first key with a content transmitting apparatus which transmits a content, where the first key is used in encrypting either a content or a second key which encrypts the content, and becomes invalid when a time period during which the first key is not used exceeds a first prescribed period;

receiving a content encrypted by using the first key or the second key;

detecting whether the time period during which the first key is not used reaches a second prescribed period which is shorter than the first prescribed period, by counting the time period during which the first key is not used, in the case where reception of the content is suspended;

transmitting, when it is detected that the time period during which the first key is not used has reached the second prescribed period, to the content transmitting apparatus, before the first key becomes invalid, information for not making the first key invalid, in the case where reception of the content is suspended, wherein:

said step of detecting includes starting of counting the time period during which the first key is not used, at a point where a connection with the content transmitting apparatus is disconnected during the reception of the content, or at a point of receiving, from the content transmitting apparatus, a response to the information for not making the first key invalid, and after the reception of the content is resumed, receiving a remaining portion of the content encrypted using the first key or the second key.

* * * * *